United States Patent
Matsumoto et al.

[15] 3,677,605
[45] July 18, 1972

[54] PRESSURE CONTROL VALVE FOR BRAKES AND THE LIKE

[72] Inventors: Shigeru Matsumoto; Toshiaki Gotoh, both of Sakado-machi, Irumagun, Japan

[73] Assignee: Nippon Oil Seal Industry Co., Ltd., Tokyo, Japan

[22] Filed: Jan. 8, 1970

[21] Appl. No.: 1,341

[52] U.S. Cl. .................... 303/6 C, 60/54.5 E, 137/512.2, 137/512.3, 137/517
[51] Int. Cl. ........................... B60t 8/26, B60t 11/34
[58] Field of Search ................ 137/512.2, 512.3, 517; 60/54.5 E; 303/6 C

[56] References Cited

UNITED STATES PATENTS

| | | | |
|---|---|---|---|
| 3,375,852 | 4/1968 | Milster | 303/6 C X |
| 3,385,637 | 5/1968 | Kersting | 303/6 C |
| 3,462,201 | 8/1969 | Lewis et al. | 303/6 C |
| 3,473,849 | 10/1969 | Smith et al. | 303/6 C |
| 3,526,437 | 9/1970 | Lewis | 303/6 C |
| 3,547,498 | 12/1970 | Bueler | 303/6 C |

*Primary Examiner*—Milton Buchler
*Assistant Examiner*—John J. McLaughlin
*Attorney*—Holman & Stern

[57] ABSTRACT

Pressure control valve for brakes and the like including a movable valve stem having two valve means associated therewith. The first valve means is normally open and permits fluid pressure to flow from the inlet to the outlet. This valve means closes when the fluid pressure reaches a first predetermined level. The second valve means is normally closed and does not open until the pressure rises to a predetermined level above the level at which the first valve means is closed. This arrangement precludes "brake lock" and "skid" or "spin" while insuring that a vehicle will stop within a given distance.

2 Claims, 7 Drawing Figures

Patented July 18, 1972

INVENTORS,
SHIGERU MATSUMOTO
TOSHIAKI GOTOH
BY Holman, Glascock, Downing & Seebold
ATTORNEYS Patented July 18, 1972

INVENTORS,
SHIGERU MATSUMOTO
TOSHIAKI GOTOH
BY Holman, Glascock, Downing &
Seebold
ATTORNEYS

PRESSURE CONTROL VALVE FOR BRAKES AND THE LIKE

BACKGROUND OF THE INVENTION

The present invention relates to pressure control valves, and relates more particularly to pressure control valves for brake systems of four-wheeled vehicles such as automobiles.

Pressure control valves are used to quickly stop a vehicle by the application of brakes on the front and rear wheels. A result of such quick stop is a phenomenon called "end-swing" which can be said to be a cause of the increase of today's more serious traffic accidents when drivers are quite often required to operate brakes on heavily crowded roads.

Heretofore some types of pressure control valves have been used in brake systems. However, in these conventional pressure control valves oil pressures applied on the front and the rear wheels of a vehicle are too high or too low to limit the stopping time and the stopping distance of the vehicle within a range of safety.

SUMMARY OF THE INVENTION

A main objective of this invention is the provision of a pressure control valve which overcomes prior art disadvantages and enables a safe and positive application of an emergency braking.

According to this invention, a pressure control valve is supplied which precludes "brake lock" and "skid" or "spin" while reducing stopping distances to a safe level.

A pressure control valve according to this invention is provided with double inner and outer valves and a delayed hydraulic system and is constructed such that at the first stage, the outer valve closes temporarily to cut pressure and to increase the primary pressure; then at the second stage, with a further rise in the primary pressure, the inner valve opens for the secondary pressure to approach the primary pressure. As one of the effects attained by the present invention, a proper amount of pressure can be applied on the front and rear wheels of a vehicle, thus quickly stopping the vehicle.

Other and further objects will be readily seen from the following detailed description of the invention which makes reference to the accompanying drawings.

DETAILED DESCRIPTION OF THE INVENTION

Now, with reference to the appended drawings features of conventional pressure control valves and features, construction and functions of those according to the present invention are described in detail.

Figure 1:
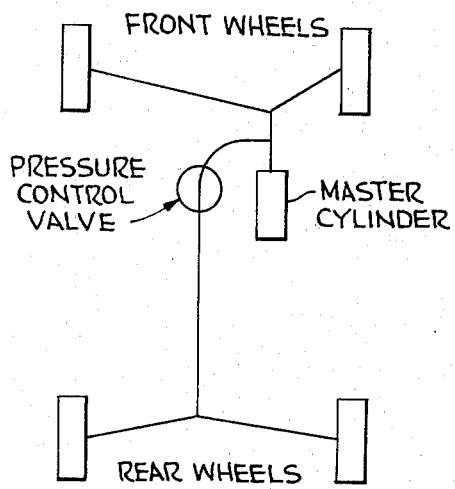
FIG. 1 is a schematic view showing the position of a pressure control valve mounted on a four-wheeled vehicle.

As shown in FIG. 1, a pressure control valve is usually mounted between a master cylinder and the rear wheel cylinders in the brake system. Pressure characteristics in this kind of valve differ in the primary and the secondary pressures. The oil pressure from the master cylinder is introduced into the front wheel cylinders and the rear wheel cylinders.

Figure 2:
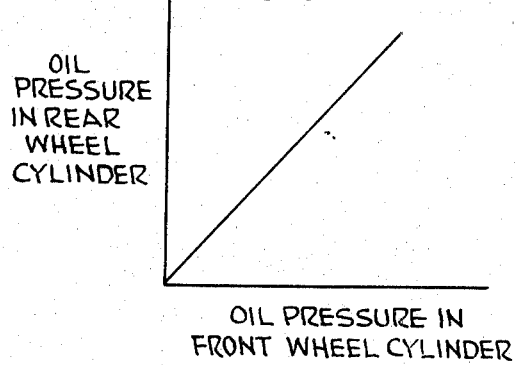
FIGS. 2 and 3 are graphical representations illustrating oil pressure characteristics in prior art braking systems utilizing no pressure control valve (FIG. 2) and a conventional pressure control valve (FIG. 3)

FIG. 2 shows the relationship between the oil pressure in the rear wheel cylinders (rear pressure) and that in the front wheel cylinders (front pressure) in a case where no pressure control valve is used. The ratio of the front to rear pressure is one as graphically seen in FIG. 2. Under these circumstances, when the brake pedal is quickly pressed (step speed) the wheels "lock" (brake lock) possibly followed by "skid" or "spin". To prevent these phenomena, braking force should be somewhat weakened. Since weakening the braking force on the rear wheels results in a longer stopping distance, this should be limited to a given degree. For example, according to a U.S. safety standard, when a brake is applied at a speed of 96 km/hr the vehicle must stop within a distance of 197 m.

Therefore, it will be understood that a pressure control valve must function to (1) act to weaken the braking force to a certain degree, while insuring that (2) the vehicle will stop within a given distance.

Figure 3:
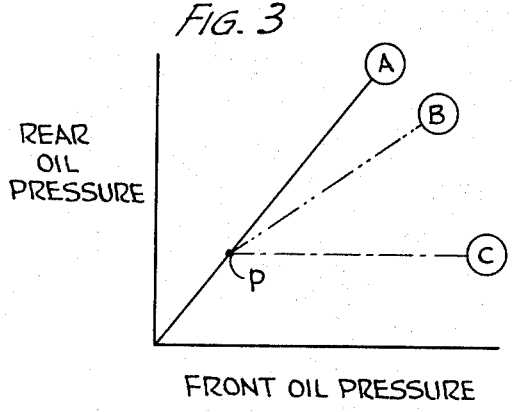

FIG. 3 graphically illustrates the oil pressure relationship in a braking system utilizing a conventional pressure control valve. The line A shows the relationship where no pressure control valve is used (corresponding to FIG. 2), with the ratio of front and rear oil pressure being 1:1. The line B shows the oil pressure relationship where a conventional valve known as "proportioning valve" is used. Here the gradient from the point P is 0.4, for example. In this case, at a high step speed, there is no provision for preventing "brake lock". This results in "skid", in other words, the first of the foregoing necessary functions of a pressure control valve is not performed. The line C shows the oil pressure relationship where a conventional valve known as a "limiting valve" is used within a pressure control valve. In this case, the rear pressure is kept "cut", while the front pressure rises. In other words, the second of the foregoing necessary functions of a pressure control valve is not performed.

Properties shown by the lines A and B indicate phenomena contrary to each other in order to sufficiently perform the two functions. However, the instant inventive concept provides a pressure control valve that can fulfill both functions at the same time.

Figure 4:
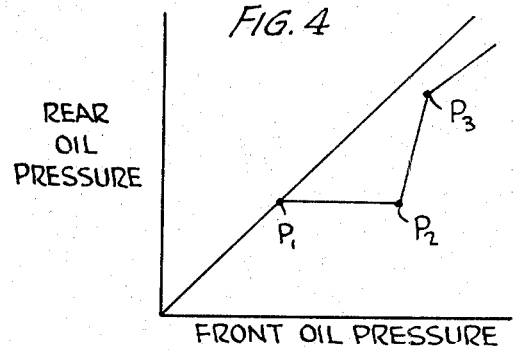
FIGS. 4 and 5 are graphical representations illustrating various properties of pressure control valves according to the present invention.

Referring to FIG. 4 for the properties of a pressure control valve in accordance with the present invention "skid" is prevented between the points P1 and P2 as by the "limiting valve" and at the point P2, the rear pressure tends to rise so as to approach the front pressure, thus shortening the stopping distance of the vehicle.

In FIG. 4 where the oil pressure relationship between the points P1 and P2 is as above described, there is one more point P3 after which the front pressure and rear pressure are parallel to each other. If the point P3 is too low, the first of the aforementioned functions is not performed, and if it is too high, the property has the same tendency as mentioned, a disadvantage of which is that when an emergency brake is operated, that is, when a step speed is high, there is a possibility of "skid". These properties can be readily varied according to this invention by merely choosing particular spring means to provide the desired relationship, all as will become more clear from the detailed description of the preferred control valve construction to be set forth hereinafter.

Figure 5:
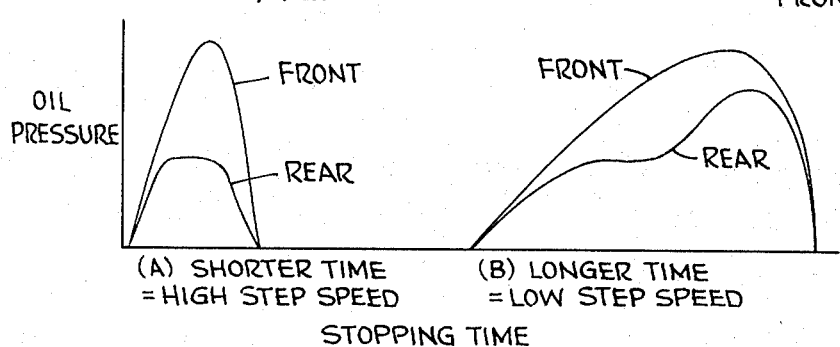

FIG. 4 shows the basic properties of the present invention. Its properties in practical use are graphically illustrated in FIG. 5, wherein the stopping time is compared with the front and rear oil pressures under both high and low step speeds. The properties shown by these curves meet completely the requirements of both of the aforementioned functions, as well as "feeling". At a high speed in a shorter time, A, "skid" easily occurs but to prevent this, rear pressure is "cut". Since stopping time tends to become longer at a low step speed in a longer time, B, at the time when there is no possibility of "skid", that is, at point P2 in FIG. 4, rear pressure rises to prevent such tendency.

Figure 6:
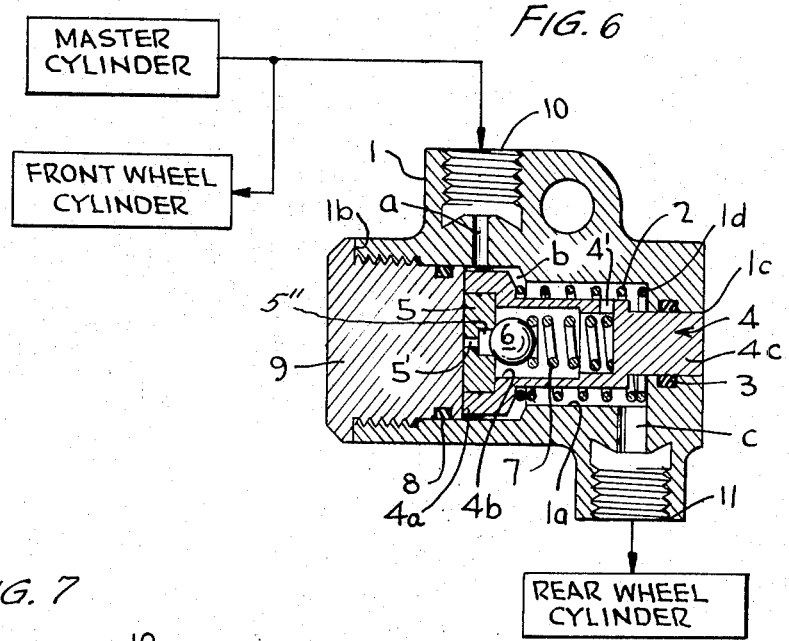
FIGS. 6 and 7 are cross-sectional views of two embodiments of pressure control valves according to this invention.
Figure 7:
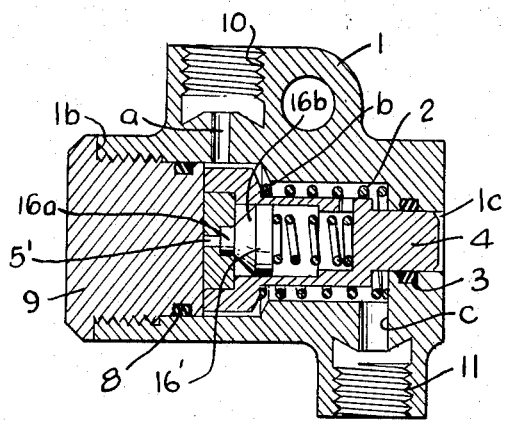

Reference is now made to FIGS. 6 and 7 for a detailed explanation of specific embodiments of pressure control valves according to this invention.

In FIG. 6, the reference numeral 1 indicates a hollow valve body defining an inner chamber 1a with open ends 1b, 1c, inside of which are received a first coil spring 2 acting between base 1d of the chamber 1a and a frustoconical head 4a of slidingly carried valve stem 4 to normally urge said valve stem and head to a first position as shown in FIG. 6. The valve stem 4 is hollow to define an inner cavity 4b closed at one end by a bushing 5. A second coil spring 7 is located within said cavity 4b and normally urges a ball 6 within said cavity into sealing relationship with a passageway 5' of a small diameter in said bushing 5. An orifice 5" of greater diameter than the passageway 5' is provided at the opposite end of the bushing 5 adjacent the ball 6. The passageway 5' functions as a kind of delayed pressure line to prevent a rapid increase in the pressure at a quick application of the brakes. In order to obtain a force great enough to force the ball 6, the orifice 5" of greater diameter than the passageway 5' is provided. A further passageway 4' is defined through said valve stem 4 to provide communication between said chamber 1a and said cavity 4b with said valve stem 4 in the position shown in FIG. 6. An inlet 10 is connected with the master cylinder and a front wheel cylinder and an outlet 11 circumferentially opposite the inlet is connected with the rear wheel cylinders. A removable cap 9 closes open end 1b and reduced portion 4c of the stem 4 closes open end 1c of the body 1. Appropriate sealing rings such as shown at 3 and 8 are provided to prevent leakage between the body and the stem, and the body and the cap, respectively.

In the illustrated condition, oil pressure paths a, b and c are provided, respectively, below the inlet 10, between the body 1 and the stem 4 and above the outlet 11, respectively. With such a construction of a pressure control valve, oil pressure from the master cylinder flows first into the valve body 1, passes to the path c through the path a between points that correspond to 0 and P1 in FIG. 4, and further is connected to the rear wheel cylinders. At the point corresponding to P1, oil pressure at the back of the stem 4 and the bushing 5 pushes the stem 4 against the valve body 1 (to the right, as seen in FIG. 6), exceeding the load imparted by the coil spring 2. Then, the oil pressure from 10 is unable to pass from a to c since the illustrated frustoconical portions of the valve body 1 and valve stem head 4a sealingly engage, and the pressure on the path c side is maintained at the value P1. Thus, the stem has the first valve portion on its outer circumference and the second valve portion on its inner circumference.

At a point that corresponds to P2 in FIG. 4, oil pressure in the hole 5' pushes the ball (to the right as seen in FIG. 6) exceeding the load provided by the coil spring 7 and passes through the hole 5' to the path c causing the rear oil pressure to rise until it approaches the value of the front oil pressure. Rear oil pressure continues to rise up to a point corresponding to P3 in FIG. 4, but since the pressures exerted on the ball 6 are in balance, it is kept constant and maintains the pressure difference corresponding to the load provided by the coil springs 2 and 7. Therefore, front and rear pressures do not coincide with each other, that is, a valve constructed as shown in FIG. 6 has the properties graphically illustrated in FIG. 4.

The embodiment illustrated in FIG. 7 differs from that of FIG. 6 only in that an ordinary valve 16 is employed instead of the ball valve 6. The valve 16 has a tip portion 16a that engages in the passageway 5' and a juxtaposed frustoconical portion 16b that seals this passageway until the pressure is sufficient to overcome the spring 7.

In any of the foregoing embodiments, it is preferred that the holes and clearances among the parts be as small as practically possible in order to delay the transfer of pressure to provide the characteristics of a delayed throttle system. This causes the secondary pressure to be "cut" when a step speed is high.

With the above-described structure and effects pressure control valves according to the present invention can meet the requirements of properties desired for valves of this kind and perform excellent functions especially when used for brakes of automobiles.

Although the present invention has been described as applied to brakes, its application is not limited thereto and obviously, it also has a number of other applications wherever a control of primary and secondary pressures is necessary.

What is claimed is:

1. A pressure control valve for front and rear brakes of an automobile and like vehicles, comprising a hollow valve body having open ends, said valve body being provided with an inlet containing fluid pressure from a master cylinder and to the front brakes and an outlet containing fluid pressure to the rear brakes, said outlet being circumferentially opposite to said inlet, said inlet and outlet being normally open for allowing the flow of the pressure fluid therethrough, a cap closing one end of the valve body, an O-ring between the cap and the valve body preventing the leakage of fluid pressure from within the valve body, a first movable hollow valve member positioned within the valve body, said first valve member having opposite ends, one end of the hollow valve member slidably closing the other open end of the valve body, an O-ring sealing said one end of the hollow valve member, the other end of said hollow valve member abutting an inner face of the cap, a first coil spring normally urging the first valve member against the inner face of the cap, a bushing press fitted in the other end of the first valve member, said bushing having first and second end faces, said first face being adjacent the inner face of the cap and having an orifice of small diameter, said second face having an orifice of larger diameter than the first-mentioned orifice, a second movable valve member located within said first valve member, and a second coil spring within said first valve member with one end thereof bearing against said other end of the first valve member and its opposite end directly engaging said second valve member for urging said second valve member normally to close said second orifice and hence the first-named orifice, so that at a rise in the pressure in said inlet to a predetermined value, the flow of the pressure fluid is stopped and at a further rise in the pressure in the inlet to a predetermined value, the fluid pressure is allowed to pass through the orifices to displace the second valve member against the action of the second coil spring and to the outlet while acting on the entire side of the second valve member opposite the orifice whereby the pressure in the outlet is equal to the pressure in the inlet to the point of the rise in the pressure in the inlet, maintains the same value to the point of the further rise in the pressure in the inlet and goes up near the pressure in the inlet only to keep parallel therewith.

2. The pressure control valve as claimed in claim 1, in which said second movable valve member is a ball.

* * * * *